June 4, 1963  R. B. RANSOM  3,092,352
LINE PICKUP MECHANISM FOR A SPINNING REEL
Filed Jan. 4, 1962
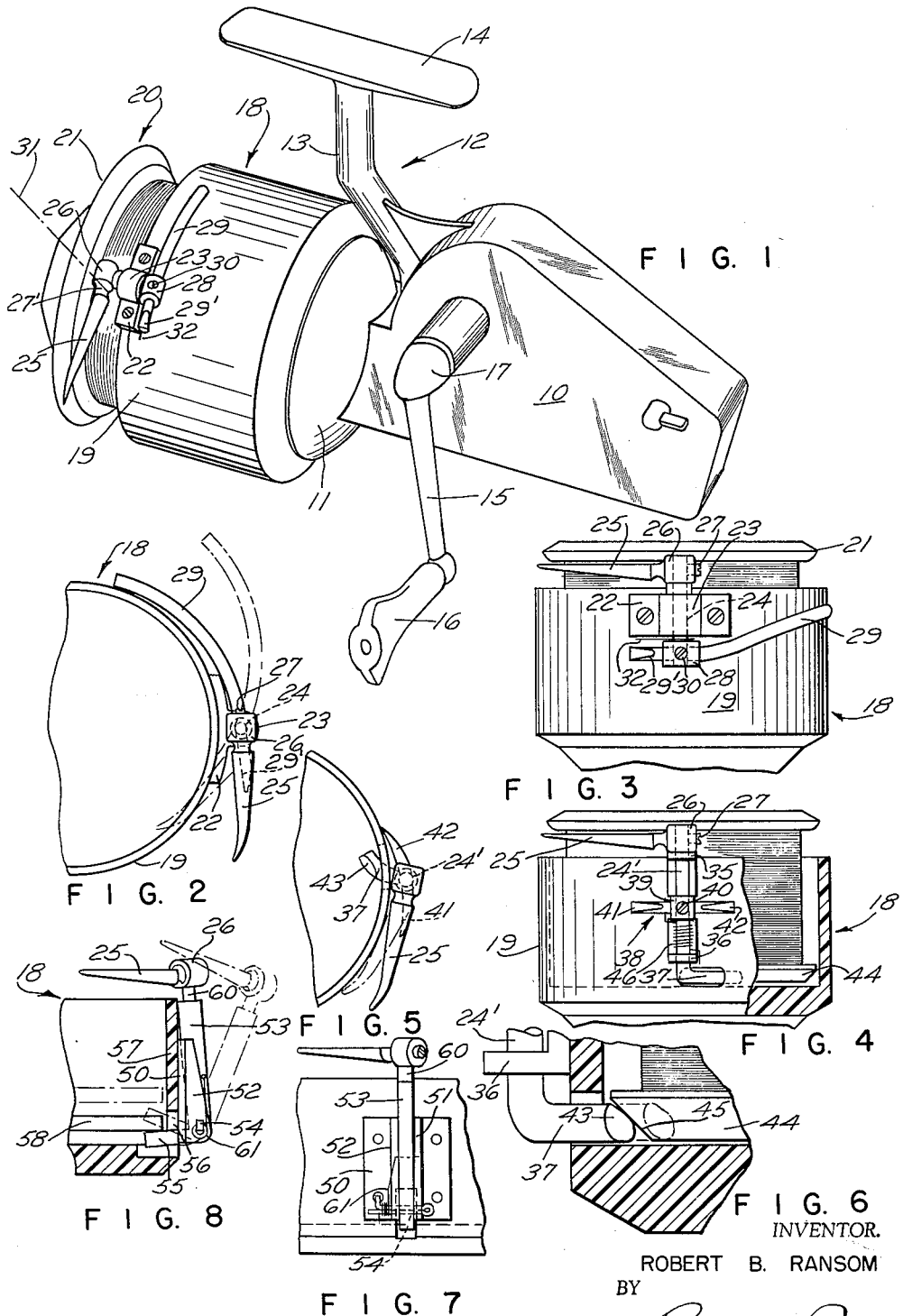
INVENTOR.
ROBERT B. RANSOM
BY
Barlow & Barlow
ATTORNEYS United States Patent Office 3,092,352
Patented June 4, 1963

3,092,352
LINE PICKUP MECHANISM FOR A
SPINNING REEL
Robert B. Ransom, Westerly, R.I.
(N. Williams Road, Weekapaug, R.I.)
Filed Jan. 4, 1962, Ser. No. 164,283
4 Claims. (Cl. 242—84.21)

This invention relates to a fishing line reel of the so-called spinning type in which the line is discharged from the reel over the end of a spool and in which the line is reeled on to the spool by some winding device which rotates relative to the spool.

Heretofore, the winding device has had a line pickup finger fixed on the winding device and often may interfere with the free discharge of the line over the end of the spool when ballooning of the line occurs due to the rapid discharge of the line from the spool, this especially being the situation when the spool is too full of line.

One of the objects of this invention is to provide a line pickup finger which will move out of the way when the line is discharged and will not be touched by the ballooning of the line.

Another object of the invention is to provide a line pickup finger which although it is well out of the way when the line is discharged may be rapidly moved into a position to pick up the line when reeling of the line about the spool is desired.

Another object of the invention is to provide an arrangement which will cause the relative movement of the line winder and the spool to direct the pickup finger into a position so that the line will be picked up and wound upon the spool.

Another object of the invention is to provide a pickup device which may be simple in construction, assembly and operation so that complicated forms of construction need not be dealt with.

With these and other objects in view, the invention consists of certain novel features of construction as will be more fully described and particularly pointed out in the appended claims.

In the accompanying drawings:

FIG. 1 is a perspective view of a fishing reel equipped with this invention;

FIG. 2 is an end view of the reel of FIG. 1 fragmentally shown and illustrating the pickup finger as swung to its inoperative position, which it will assume when the line is discharged from the reel;

FIG. 3 is an elevation of the spool, winder, and pickup finger shown in FIG. 1;

FIG. 4 is an elevation of the spool and winder partly in section showing a modified pickup finger;

FIG. 5 is a top plan view of a fragmental portion of the winder with the finger of FIG. 4 mounted thereon;

FIG. 6 is a fragmental sectional view on a somewhat larger scale showing the relative position of a spool and the bent-in end of the shaft on which the pickup finger is mounted;

FIG. 7 is an elevation of a fragmental portion of a winder with a still different modified form of pickup finger; and FIG. 8 is a sectional view of the finger of FIG. 7 mounted on a fragmental portion of the winder.

This invention, as it applies to a spool and a cup shape winder which are relatively reciprocal and rotatable, proceeds on the basis of a movably mounted pickup finger fulcrumed on the external cylindrical surface of the winder and movable as the winder rotates and the spool reciprocates so as to move the finger towards the axis of rotation into a position to pick up the fishing line and, when picked up, wind it on the spool, the pickup finger being actuated in various ways.

With reference to the drawings, 10 designates a gear casing upon one end of which there is a base 11 while a bracket designated generally 12 comprises an angular arm 13 having a saddle plate 14 which will receive the fishing rod. A crank 15 having a handle 16 may be rotated to turn a shaft having a hub 17 to actuate the gears in the casing 10. A cup shape line rotatable winder designated generally 18 has an outer cylindrical surface 19, while within this winder there is located a spool 20 having an outer head 21 which spool is non-rotatably mounted upon an axis for reciprocation into and out of the cup 18, and as this reciprocation into and out of the cup without rotation occurs, the winder or cup 18 rotates about the spool. This is accomplished by a mechanism such as shown in the prior patents, No. 2,687,855 of August 31, 1954 and No. 2,879,954 of March 31, 1959 and others and constitutes no direct part of the invention which is hereinafter described.

Upon the outer cylindrical surface 19 of the winder 18, there is a boss 23 providing a bearing, this boss being shown as carried by a bracket 22 secured to the cup wall. A shaft 24 is mounted in this bearing on an axis parallel to the axis of rotation of the winder 18 and will revolve about this axis. Upon one end of this shaft 24 a pickup finger 25 is mounted by means of its hub 26 having an opening to receive the end of the shaft and held on to the upper end of the shaft by a set screw 27 enabling it to be adjusted with reference to the shaft to a desired position. This pickup finger 25 is provided with a groove 27' at a point close to its hub 26 so that as the line is picked up and slid along its tapered surface, it will lodge into this reduced portion or groove and there be maintained during the rotation of the winder about the spool. The line when in this position also assists in holding the pickup finger swung inwardly toward the axis of the spool and winder. Upon the lower end of the shaft 24, there is a sleeve 28 secured through which an elongated weight 29 extends and is held in desired position by a set screw 30. This weight acts as a counterweight and is such that when the winder is rotated, it will through centrifugal force swing the finger 25 inwardly toward the axis of the spool and thus into a position so that it will pick up the line 31 extending from the spool over the flange of the head 21. The end 29' of this weight will limit the inward movement of the pickup finger while the weight itself will limit its outward movement. It might be explained that the gearing mechanism is such as to rotate the winder 18 about three times for every revolution of the handle, thus causing the winder to operate at a high velocity and one which will create sufficient centrifugal force on the weight 29 to swing it outwardly and the finger 25 inwardly to position the finger toward the axis of rotation as desired. A spring as shown in FIG. 3 at 32 will swing the finger 25 outwardly and away from the axis of rotation when the winder is at rest. This pickup finger and its stop will be adjusted so that its pickup point may move inwardly beyond the radius of the spool head 21. This spool head 21 is beveled in both directions or so contoured as to enable an axial movement of the spool to cause the pickup finger to engage the surface of the head and move outwardly sufficiently to move over the head's largest diameter and then in again so that it will be accommodated past the head as reciprocation occurs.

In some cases the pickup finger may be mounted as shown in FIG. 4 where its shaft 24' is mounted in two bearings 35 and 36, and the end of the shaft 24' is provided with a lever arm 37 either by means of turning the shaft 24' inwardly as seen in FIG. 6 or by separately providing this lever arm. In this case in order to limit the movement of the pickup finger, a wing type stop device 38 is mounted on the shaft 24' by sleeve 39 and set screw 40 so that its arms 41 and 42 which will engage the cylindrical surface 19 of the winder 18 and limit the movement of the pickup finger in both directions as desired. A spring 46 engaging shaft 24' swings the pickup finger outwardly away from the axis of rotation.

In the case of the showing of FIG. 6, in order to positively swing the finger to provide a pickup of the line 31, I have beveled the end of the lever 37 as at 43 and provided a spool head 44 beveled as at 45 so that as the spool moves into the cup and the beveled surfaces 45 and 43 engage, the lever 37 will be swung to rotate the shaft 24' and thus swing the pickup finger 25 in toward the axis of the shaft as shown in dotted lines in FIG. 5. The stop will be adjusted so the pickup end of the finger will just engage the largest diameter of the spool head 21.

A different mounting of the pickup finger is shown in FIG. 7. Here a bracket 50 is provided with ears 51 and 52, and between these ears there is pivoted a shaft or rod 53 by means of a pin 54 extending through the ears 51 and 52 and through the shaft. This shaft is provided with a short lever arm 55 which extends through a slot 56 in the wall 57 of the cup 18 so that when the lower head 58 of the spool moves into the cup, it will strike this short lever arm 55 and swing the shaft or rod 53 inwardly and thus carry the pickup finger 25 having hub 26 mounted on the reduced portion 60 of the long lever arm so as to swing it into a position so that it will pick up the line directing it into a position to be wound about the spool to reel the same thereon. In this case the lower edge of the spool does not need to have a bevel but may be a flat end such as shown in FIG. 8. A spring 61 swings the pickup finger outwardly by swinging rod 53 about its pivot pin 54.

Although I have shown three mechanical situations for moving the pickup finger, it will be apparent that other means of moving the finger to and from operative position may be used within the scope of this invention.

I claim:

1. In a fishing reel having a spool and concentric line winder, means for attaching the reel to a rod, said means mounting a line winder for rotation about said spool on an axis extending substantially in the direction of the axis of the rod, means to rotate said winder, a line pickup finger, means to movable mount said finger on said line winder for movement toward and from the axis of the spool, and means weighting said pickup finger to swing said finger toward the axis of the spool under centrifugal force as said line winder is rotated relative to the spool to pick up the line and cause it to rotate with the winder to assemble the line on the spool.

2. In a fishing reel as in claim 1 wherein said finger is pivoted and the pivot axis of said finger is parallel to the axis of rotation of said winder.

3. In a fishing reel as in claim 1 wherein there is a spring to urge said finger away from the axis of the spool, said spring being of a strength less than the centrifugal force developed whereby to swing the finger away from the axis of the spool when the winder is stopped.

4. In a fishing reel having a spool and concentric line winder, means for attaching the reel to a rod, said means mounting a line winder for rotation about said spool on an axis substantially in the direction of the axis of the rod, means to rotate said winder, a shaft pivotably mounted on said winder parallel to the axis of rotation of said winder, a line pickup finger mounted on said shaft to swing about the axis of the shaft toward and from the axis of rotation of the winder and a weight arm on said shaft to be responsive to centrifugal force to rotate said shaft and swing the pickup finger toward the axis of rotation of the winder.

References Cited in the file of this patent

UNITED STATES PATENTS

| 2,615,647 | Palmer et al. | Oct. 28, 1952 |
| 2,628,444 | Oak | Feb. 17, 1953 |

FOREIGN PATENTS

| 576,755 | Great Britain | Apr. 17, 1946 |